Jan. 7, 1964     M. A. SCHOOS     3,116,543
BALL BEARING ASSEMBLY AND LOADING APPARATUS
Original Filed Oct. 23, 1959     2 Sheets-Sheet 1

*INVENTOR.*
MAURICE A. SCHOOS

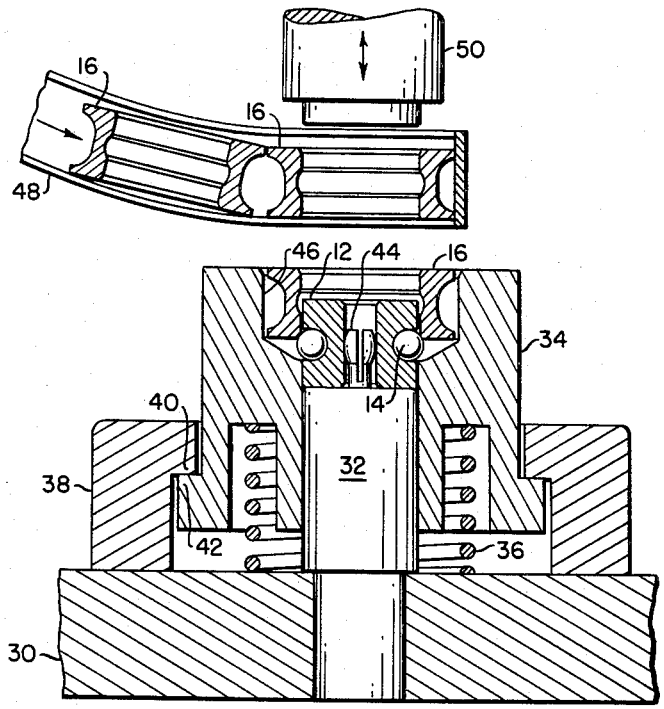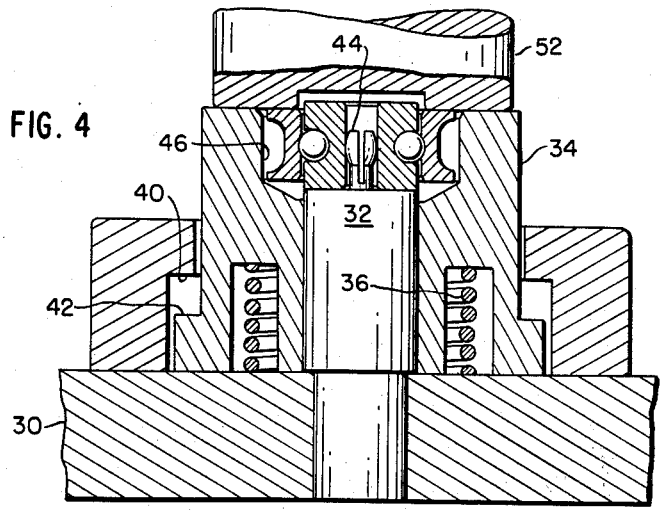

3,116,543
BALL BEARING ASSEMBLY AND LOADING
APPARATUS
Maurice A. Schoos, Warwick, R.I., assignor to Kenney Manufacturing Company, Cranston, R.I., a corporation of Rhode Island
Original application Oct. 23, 1959, Ser. No. 848,262, now Patent No. 3,034,839, dated May 15, 1962. Divided and this application Nov. 17, 1960, Ser. No. 69,993
1 Claim. (Cl. 29—201)

This invention relates to frictionless bearings and more particularly comprises improvements in the method of making ball bearing assemblies fabricated, at least in part, by resilient rigid plastic materials, particularly the fiber-forming crystalline high polymers such as nylon. This invention also includes a novel apparatus useful for assembling the improved bearing.

Low cost, light load ball bearing assemblies are presently in great demand for a large number of different applications. Bearing assemblies in which either or both races are fabricated from self-lubricating plastic materials are particularly useful in pulleys for traverse rod assemblies, rollers for cabinet drawers, idler pulleys for movie projectors as well as for a great many other uses.

Under present practice it is the custom for at least one of the plastic races of such bearings to be made in two or more parts. The inner race may be of one piece with the outer race made up of two or more parts that are adapted to engage with one another over the inner race. The outer race in such case may take the form of a standard race bisected either axially or in a plane normal to the race axis. Once the balls are positioned in the inner race groove the two parts of the outer race are brought together and locked in place. The outer race parts may be fixed to one another by an adhesive, by heating the pieces to a temperature high enough to cause fusion between them or by mechanical means. In any event the multiplicity of parts and the several assembly operations required combine to increase the cost of producing the bearing.

It is one object of the present invention to reduce the cost of producing bearings having plastic races. This object is achieved by providing a one-piece outer race member having sufficient elasticity to be pressed axially into position about a one-piece inner race member having a proper charge of bearing balls disposed thereabouts.

Another object of this invention is to provide an inexpensive ball bearing assembly that is easily assembled and dependable in operation. This object is attained by molding both the inner and outer races from a self-lubricating plastic material such as nylon, Teflon or the like. When the races and the balls have been oriented they may be pressed into engagement by an ordinary hydraulic press. Once this operation is finished the assembling of the bearing is completed. As a feature of this invention the edges of the ball groove in the outer race are beveled to eliminate any burring or flashing that might otherwise occur when the race is pressed past the balls.

Another feature of this invention relates to a novel apparatus which may be used to facilitate assembly of the bearing parts.

These and other features and objects will become more readily apparent from a detailed description of a preferred embodiment of the invention taken together with the accompanying drawings in which:

FIG. 3 is a cross sectional view in elevation of a loading apparatus, and

FIG. 4 is similar to FIG. 3 but showing the apparatus in its assembled position.

Figure 1:
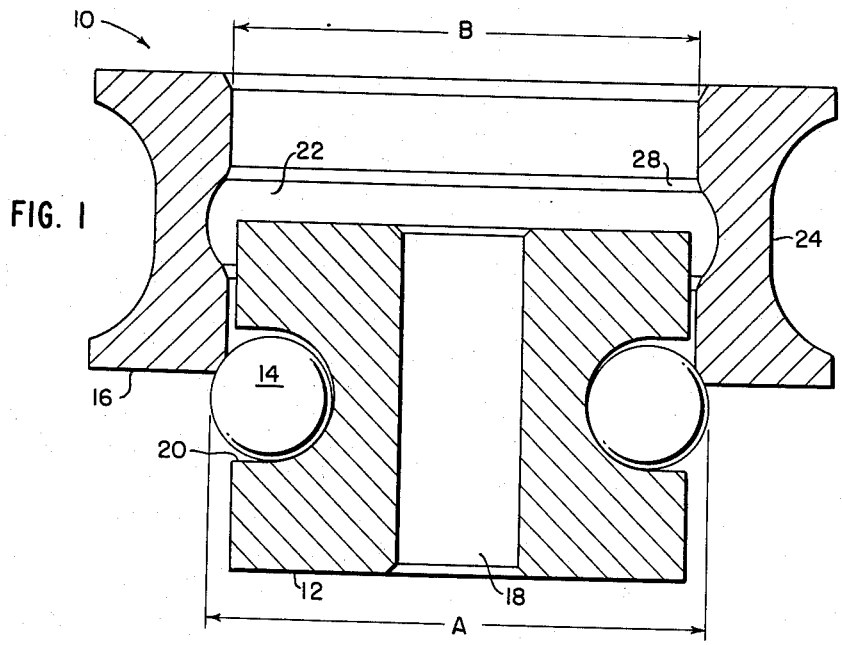
FIG. 1 is a cross section of a pulley made in accordance with the invention and showing the parts arranged in a position just prior to being pressed together.

Referring now to the drawings, the reference character 10 generally indicates a bearing assembly which, in this embodiment, is in the form of a pulley such as may be used in a traverse rod for curtains and drapes. The bearing assembly 10 comprises an annular inner ring or race member 12, a plurality of bearing balls 14 and an annular outer ring or race member 16. Preferably, both the inner and outer races are molded by an injection process from nylon, Teflon or the like. These materials are relatively resilient, hard, and characterized by a rather smooth waxy surface suitable for use as a bearing material in that no lubrication is required and minimum wear is involved. The inner race 12 is formed with an axial bore 18 to receive suitable supporting means. A rather deep, U-shaped ball groove or raceway 20 extends about the circumference of the inner race 12 and substantially encloses the balls 14 disposed therein. Standard steel bearing balls may be used and for a ¾ inch diameter bearing assembly, it has been found that nine .125" balls are sufficient.

The outer race member 16 is formed with a rather shallow ball groove or raceway 22 about its inner peripheral portion. This groove 22 is arcurate in cross section but spans only a relatively small portion of the balls. An outer groove 24 is provided about the outer race when the assembly is to be used as a pulley. Various other configurations such as gear teeth or the like may be formed to suit particular applications.

Figure 2:
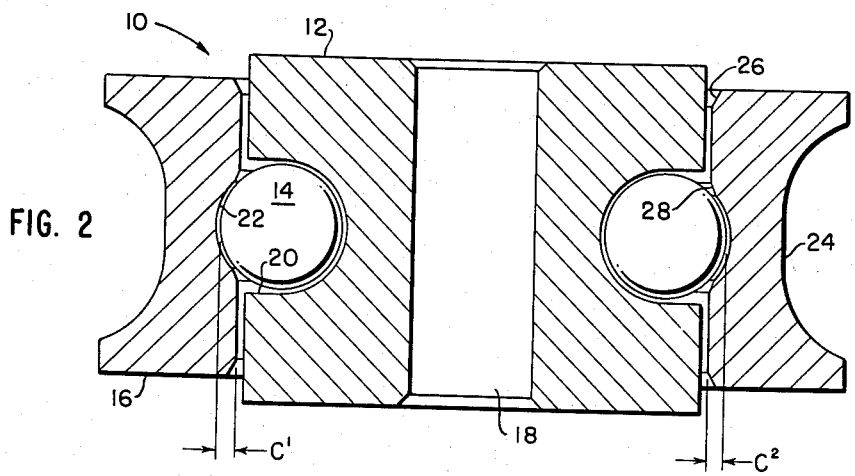
FIG. 2 is a view similar to FIG. 1 but showing the parts in assembled position.

Assembling of the bearing is achieved by locating the proper number of bearing balls within the groove 20 (FIG. 1) and pressing the outer race 16 axially over the inner race 12 and the balls until the parts snap into the position shown in FIG. 2. As the outer race is being pushed past the balls, its diameter must not expand beyond its elastic limit. Taking the difference between the outer diameter of the inner race with the balls in place (A, FIG. 1) and the minimum diameter of the outer race (B, FIG. 1) as the assembly clearance ($C^1 + C^2$ FIG. 2), it is necessary that this clearance be within the elastic limit of the outer race to prevent its permanent enlargement or breakage during assembling. To ease the outer race over the balls the outer edges may be beveled at 26. Because of the pressure created during the assembling operation the balls might wipe or permanently displace small portions of the inner surface of the outer race. Should these displaced portions form a ridge or lip extending into the groove 22 the run of the balls and the free movement of the race would be impeded. To avoid any such occurrence the edge of the groove 22 is beveled as at 28. This beveled edge completely eliminates the problem, for whatever ridge is created during assembling will not be in a location that will interfere with the operation of the bearing.

A bearing of the type described is extremely easy and inexpensive to manufacture. Although the races are preferably formed by a molding process other methods such as machining or the like may also be used to advantage.

By forming the groove 20 relatively deep in relation to the groove 22 the inside diameter of the outer race will be of a dimension which will permit it to be pressed axially into place without exceeding the elastic limit of the outer race member. Also the annular space between the races is kept as narrow as possible to prevent the entry of lint and dust.

In view of the fact that both races are one piece affairs at least one assembly operation has been eliminated since there is no need to engage a locking member or to otherwise fasten together parts of a race as was formerly the case.

Although the inner race has been described as fabricated from the same material as the outer race member it is by no means critical that it be so. Metal, wood, glass or other materials may be substituted for the plastic material described. However, it has been found that nylon is preferable from the standpoint of economy, dependability and because of its lubricating characteristics.

In FIGS. 3 and 4 there is illustrated an apparatus which may be used to press the outer race 16 over the inner race 12 and the balls 14. The apparatus shown herein comprises a support 30 having an upwardly projecting cylindrical post 32 mounted thereon. An annular nest 34 is mounted for reciprocation about the post 32 and is normally urged to the upward position shown in FIG. 3 by a coil spring 36. A collar 38 fixed to the support 30 concentrically about the post 32 is provided with flanged portion 40 adapted to engage a shoulder 42 in the nest 34 to limit the upward movement of the nest.

The upper portion of the post 32 is provided with a bifurcated collar 44 projecting vertically upwards and is dimensioned to fit within the bore 18 of the inner race and engage the walls thereof.

The nest 34 is provided about its upper portion with a well 46 slightly larger in diameter than the outside diameter of the outer race 16 and has vertical walls generally of the same height as the width of the outer race. As is clear from the drawing the lower portion of the well 46 slopes towards the post 32 for the purpose which will be presently set forth.

In assembling the bearing 10 in the loading apparatus, the inner race 12 is first deposited on the post 32 with the collet 44 snugly engaging the walls of the bore 18. To accomplish this operation on a mass production basis the races may be introduced by a hopper fed chute with a reciprocating plunger coaxially arranged with respect to the post 32 and adapted to push an inner race over the collet automatically.

Once an inner race 12 is in position a quantity of bearing balls 14 are metered automatically into the well 46. The bottom portion of the well, being sloped, causes the balls to roll into their intended positions in the groove 20.

In the next operation the outer race 16 is fed from chute 48 and deposited in the well 46 by a plunger 50 (FIG. 3). At this point the bevel edge 26 of the outer race is resting on the balls 14 and assists in holding the balls radially inward.

As seen in FIG. 4 a piston 52 is brought down upon the outer race and the nest pressing them both simultaneously so as to snap the outer race over the balls into position and to push the nest clear. For a bearing having the dimensions and materials described above a pressure of 200 p.s.i. is required against the outer race. When the pressure is released and the piston withdrawn the spring 36 will push the nest upwards thereby stripping the assembled bearing 10 off the collet 44. A suitable automatic pick-off apparatus can be brought to bear to remove the bearing from the nest.

Although the invention has been described with particular reference to a bearing in which a one-piece nylon outer race is pressed into assembled position, it will be obvious to those skilled in the art that a great many modifications may be made to the invention. For instance, a wide range of materials may be substituted for the nylon specified herein. Also it may be desirable for some applications to provide a bearing in which the inner race is pressed into position rather than the outer race. For such an embodiment the outer race would be provided with a deep ball groove and the inner race would have a shallow ball groove with beveled edges. In any case it will be appreciated that the depth of the race is related to the modulus of elasticity of the particular plastic material such that in assembling the bearings the elastic limit is not exceeded. Also it may be desirable for some purposes to substitute needle or roller bearings for the ball bearings described. Many other modifications may be made both to the bearing and to the loading apparatus without departing from the spirit of the invention.

This application is a division of applicant's co-pending application, Ser. No. 848,262, filed October 23, 1959, now Patent No. 3,034,839.

What I claim and desire to secure by Letters Patent of the United States is:

Apparatus for assembling a ball bearing comprising a support, a cylindrical post vertically mounted on said support adapted to receive and support an inner ball bearing race member, a reciprocable nest surrounding said post and having a well formed in the upper portion thereof adapted to receive an outer ball bearing race member, a lower portion of said well being inwardly sloped to direct balls toward said inner race member, a reciprocable plunger movable vertically toward said post adapted to bear downwardly on said nest and an outer race member thereon, thereby to force said outer race member about said inner race member and to depress said nest, and means for raising said nest whereby the assembled ball bearing is lifted by said nest from said post.

References Cited in the file of this patent
UNITED STATES PATENTS

| | | |
|---|---|---|
| 941,632 | Geschke | Nov. 30, 1909 |
| 1,048,758 | Sultemeyer | Dec. 31, 1912 |
| 1,074,228 | Whitney | Sept. 30, 1913 |
| 1,153,066 | Gurney | Sept. 7, 1915 |
| 1,401,680 | Dleak | Dec. 27, 1921 |
| 2,702,216 | Stearns | Feb. 15, 1955 |